United States Patent [19]

Inniss et al.

[11] Patent Number: 5,708,832
[45] Date of Patent: Jan. 13, 1998

[54] NETWORK REDIRECTION FOR THE ENHANCEMENT OF SERVER CAPACITIES

[75] Inventors: Hadyn A. Inniss, Irving; Robert P. Welch, Colleyville, both of Tex.

[73] Assignee: International Business Machines Corporation, Armonk, N.Y.

[21] Appl. No.: 232,306

[22] Filed: Apr. 25, 1994

Related U.S. Application Data

[63] Continuation of Ser. No. 765,903, Sep. 24, 1991, abandoned.
[51] Int. Cl.$^6$ ............................................. G06F 15/00
[52] U.S. Cl. ............. 395/800; 395/200.06; 395/200.12; 395/610
[58] Field of Search ....................... 395/800, 600, 395/200, 650, 200.03, 200.06, 200.12, 610; 364/222.82, 228.4, 282.4

[56] References Cited

U.S. PATENT DOCUMENTS

| | | | |
|---|---|---|---|
| 4,274,139 | 6/1981 | Hodgkinson et al. | 395/200.09 |
| 4,714,995 | 12/1987 | Materna et al. | 395/617 |
| 4,872,157 | 10/1989 | Hemmady et al. | 370/400 |
| 4,914,571 | 4/1990 | Baratz et al. | 395/610 |
| 5,001,628 | 3/1991 | Johnson et al. | 395/610 |
| 5,019,963 | 5/1991 | Alderson et al. | 395/617 |
| 5,021,949 | 6/1991 | Morten et al. | 395/200.09 |
| 5,191,611 | 3/1993 | Lang | 380/25 |
| 5,195,092 | 3/1993 | Wilson et al. | 370/94.2 |
| 5,212,789 | 5/1993 | Rago | 395/608 |
| 5,218,697 | 6/1993 | Chang | 395/200.18 |
| 5,247,575 | 9/1993 | Sprague et al. | 380/9 |
| 5,247,664 | 9/1993 | Thompson et al. | 395/610 |
| 5,475,819 | 12/1995 | Miller et al. | 395/200.03 |

Primary Examiner—Alyssa H. Bowler
Assistant Examiner—John Follansbee
Attorney, Agent, or Firm—Whitham, Curtis, Whitham & McGinn; Edward H. Duffield

[57] ABSTRACT

A network architecture and methodology provides two stages or levels of network redirection to allow effective importation of storage into either or both of a client/requester and a server. Each level of redirection is achieved through the establishment of a bi-directional communication link, preferably by the creation of an access list or export file at each host containing a portion of a distributed resource. By using two levels of network redirection, a terminal communicates only with a single, predetermined server, thus permitting the use of user-friendly Lan server systems. The predetermined server communicates with the remainder of the network as a client through the network communication protocols, thus removing constraints on operating systems which may be running at hosts. Full access to the distributed resource is thereby made transparent to the user and operational limitations engendered by limitations of hard disk capacity at terminals and servers are overcome.

9 Claims, 4 Drawing Sheets

NETWORK REDIRECTION FOR THE ENHANCEMENT OF SERVER CAPACITIES

This application is a continuation of application Ser. No. 07/765,903, filed Sep. 24, 1991.

BACKGROUND OF THE INVENTION

1. Field of the Invention

The present invention generally relates to data processing networks and, more particularly, to data processing networks having distributed storage and other resources.

2. Description of the Prior Art

The use of networks to interconnect a plurality of terminals, computers and, most particularly, personal computers (PC's) to enhance data processing capability is well-known. In particular, network interconnection of PC's has allowed the development of Virtual Machine (VM) systems including Multiple Virtual Storage (MVS) which allows any terminal to access files existing on any connected computer, mass storage or other terminal as if that file and all other files existing on any connected computer, mass storage or terminal existed on the local terminal. This concept can be extended to any addressable resource connected to the network including applications programs and peripheral devices, such as printers, and is commonly referred to as a distributed resource.

Such virtual machine systems can be implemented on networks of any size and are typically supported by the operating system software used on the network. For instance, the IBM/Microsoft Operating system/2 (OS/2)™, Versions 1.2 and above introduce and support the concept of an Installable File System (IFS) in which a file or directory can be mounted as a file or directory existing on the local machine. For small networks such as Local Area Networks (LAN's), the IBM/Microsoft LAN server™ is an extremely user-friendly system for accessing the files of a single machine, such as a file server which is central to the network. For larger networks, operating systems such as UNIX™, AIX™, MVS™, VM™, ULTRIX™, etc. support access to a distributed resource.

While LAN (local area network) file servers such as the IBM/Microsoft LAN server™, referred to above, usually require very little user sophistication or knowledge of the technological details of the network, this is achieved at the cost of limiting access to files on a single machine and the requirement that all terminals of the network which may contain a file to which access is required must be running the same network operating system. This is a very serious limitation, in practice on many networks, particularly as the networks become large, since many desirable resources exist and may be included on machines in the network which cannot support execution of the particular LAN server program. For instance, the IBM/Microsoft LAN server™ program is not supported by MVS™, VM™, AS/400™, System 6000™ and a wide range of OEM systems.

TCP/IP-NFS™ technology (a communication protocol which runs underneath the operating system to allow communication in a heterogeneous environment of differing operating systems rather than an operating system, itself) is possibly used in the widest range of computer systems and implementations of NFS™ exist for the above noted systems which do not support the IBM/Microsoft LAN server™. However, under the NFS™ system and similar systems, the user wishing to access a file existing on another machine of the distributed resource must specify both the machine where the file exists and the desired file. This knowledge of the system which such a user is required to possess is not resource do not appear to the user to exist on the trivial and may pose a substantial burden in the use of the system and accessing the distributed resource. Certainly, files of the distributed local terminal and thus detract from the use of the terminal as an ideal virtual machine where all files should ideally appear to be locally resident.

A complicating factor in the development of an ideal virtual machine system is the question of security, file integrity and limitation of access to particular files. Systems such as UNIX™, AIX™, etc., noted above, provide for a system administrator access to determine the granting of access to particular files or groups of files. From the viewpoint of the user, the accessing of files of the distributed resource is certainly not transparent and the files to which access has been granted do not appear to be resident on the local terminal. The user must also request accessible files in a separate operation and, typically, a separate logon operation.

SUMMARY OF THE INVENTION

It is therefore an object of the present invention to provide a system and methodology which renders access to a distributed resource fully transparent to the user.

It is another object of the invention to provide a system and methodology which avoids constraints upon the operating systems which must be run on computers connected to a network while allowing access to the full extent of a distributed resource through a LAN server and a single LAN logon by the user.

It is a further object of the invention to provide the above objects in a fashion which is fully compatible with existing file access control arrangements under the supervision of a system administrator.

It is another further object of the invention to provide improved user convenience and to reduce the requirement of user sophistication for use of systems which support access to distributed resources.

It is yet another object of the invention to provide user-transparent access to a distributed resource in such a manner that the entirety of the distributed resource to which access has been granted appears to be resident on each terminal of the network.

In order to achieve the aforementioned and other objects of the invention, a method of accessing portions of a distributed resource existing on one or more of a plurality of data processing means linked by a network is provided comprising the steps of forming a first link of the network between a first data processing means in which a portion of the distributed resource exists which is accessible by a predetermined user and a second data processing means and forming a second link of the network between a terminal and a the second data processing means.

In accordance with another aspect of the invention, a network is provided having a plurality of data processing means and a distributed resource, and including a link between a terminal of the network and a predetermined data processing means, and a link between the predetermined data processing means and a further data processing means, the further data processing means containing a portion of the distributed resource accessible by a predetermined user associated with the terminal.

In accordance with a further aspect of the invention, the method and network provided as described above may further contain an access list defining users having access to particular portions of the distributed resource and wherein such portions (e.g. files) of the distributed resource may be installed on terminals connected to the network or data processing means contained in the network and functioning as a server for the terminal, or both.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
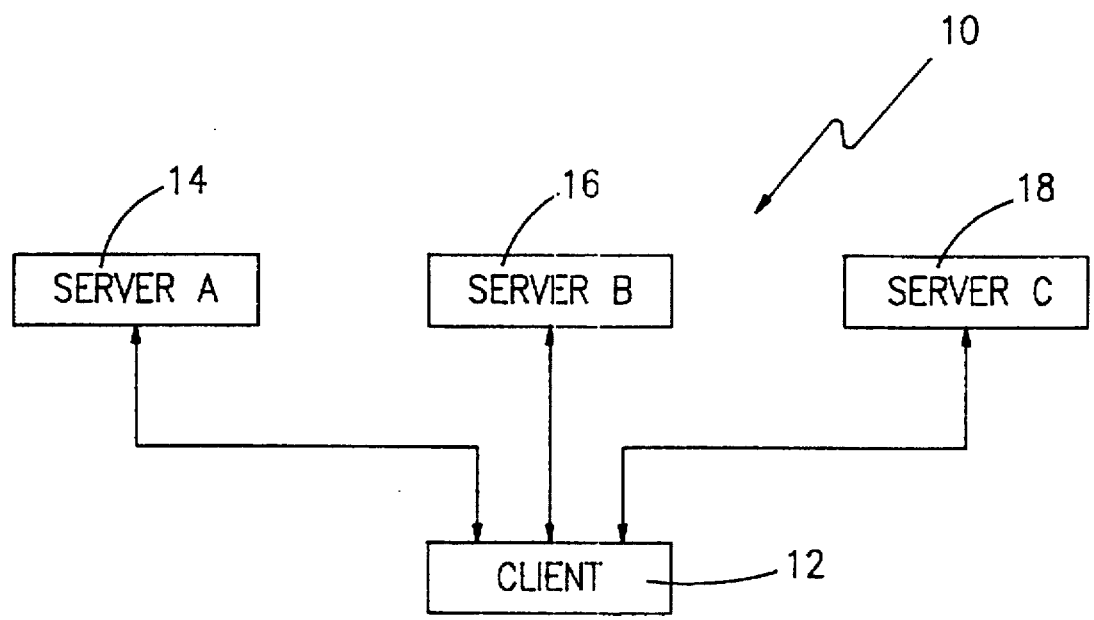
FIG. 1 is a schematic diagram of the architecture of a Virtual Machine system according to the prior art.

Referring now to the drawings, and more particularly to FIG. 1, a typical architecture of a Virtual Machine system (VM) 10 is shown. Client 12 is exemplary of any terminal at any node of the network. Portions of the distributed resource are depicted as servers A, B and C. 14, 16, 18. When Client 12 wishes to obtain access to a file existing within the system at one of the servers 14, 16, 18, a bi-directional communication must be made directly with the server which owns the file. The server then directly transmits the file to the client 12. As indicated above, the client must establish the communication with the server which own the desired file and must specify an identification of the server as well as the identity of the desired file. Thus, each user must have detailed knowledge of the network which is coextensive with the access to the system which is authorized to that user.

Figure 2:
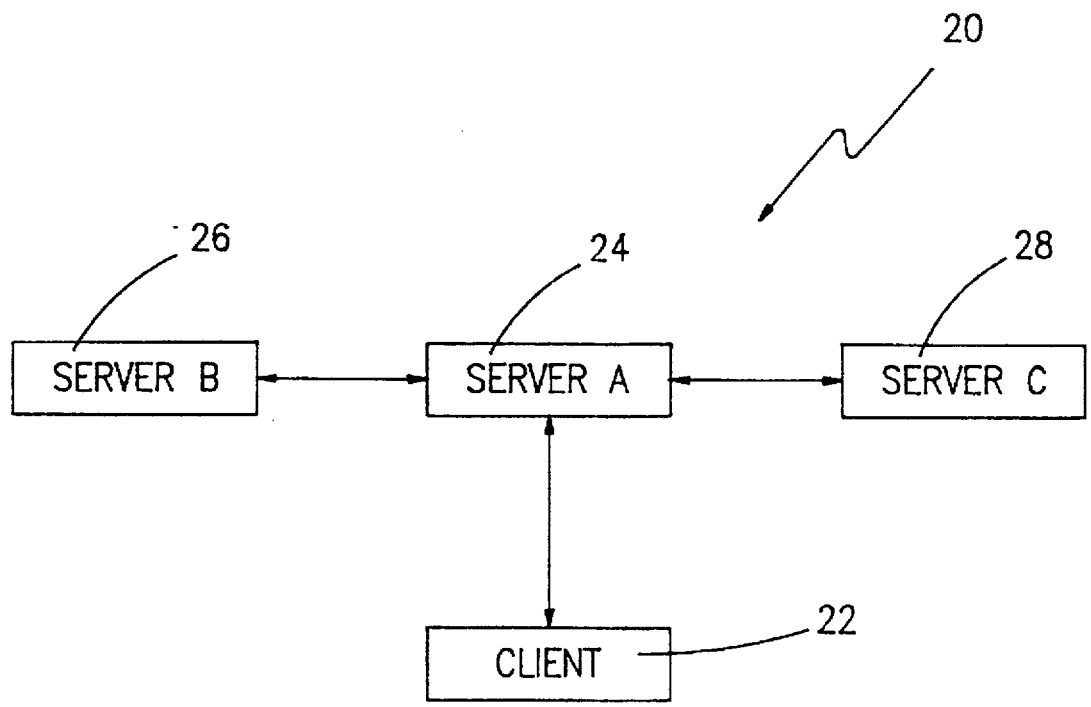
FIG. 2 is a schematic diagram of the virtual machine system according to the invention.

In contrast, the architecture of the present invention 20, as illustrated in FIG. 2, uses server A 24 to redirect access to servers B 26 and C 28 by forming network communication links thereto and a single communication link between a terminal associated with a predetermined user and a predetermined data processing means functioning as a server (e.g. server A). By achieving this architecture, client 22 communicates directly-only with server A 24. Therefore, portion of the distributed resource existing at servers B and C effectively exist at server A and client 22 sees only a single server. Viewed in another way, servers B and C effectively export storage space to server A and user-friendly LAN servers such as the IBM/Microsoft LAN server™, referred to above, are able to access any portion of the distributed resource to which access has been granted. By the same token, the access to any portion of the distributed resource becomes entirely transparent to the client 22 which sees only its own server, server A 24. Therefore, the virtual machine of client 22 appears to hold the entire contents of the distributed resource.

It should be understood that the concept of an installable file system is assumed to exist at the client, by virtue of use of the OS/2 operating system, version 1.2 or later, or some similar operating system allowing any file which can be accessed to be mounted over any existing portion of its own file structure. This operation is well-understood in the art and can be accomplished in numerous ways. In practical effect, it differs from the mere copying of a file or directory into a directory or sub-directory created to receive such data only in that the mounted data is eventually returned to the owner and the directory or sub-directory created to receive the mounted file or directory is automatically created and removed when access is granted and relinquished, respectively. Thus the mounting process causes the lines between an owner and user to effectively blur since, during access to the mounted data, the user effectively owns the file or directory so accessed.

Figure 3:
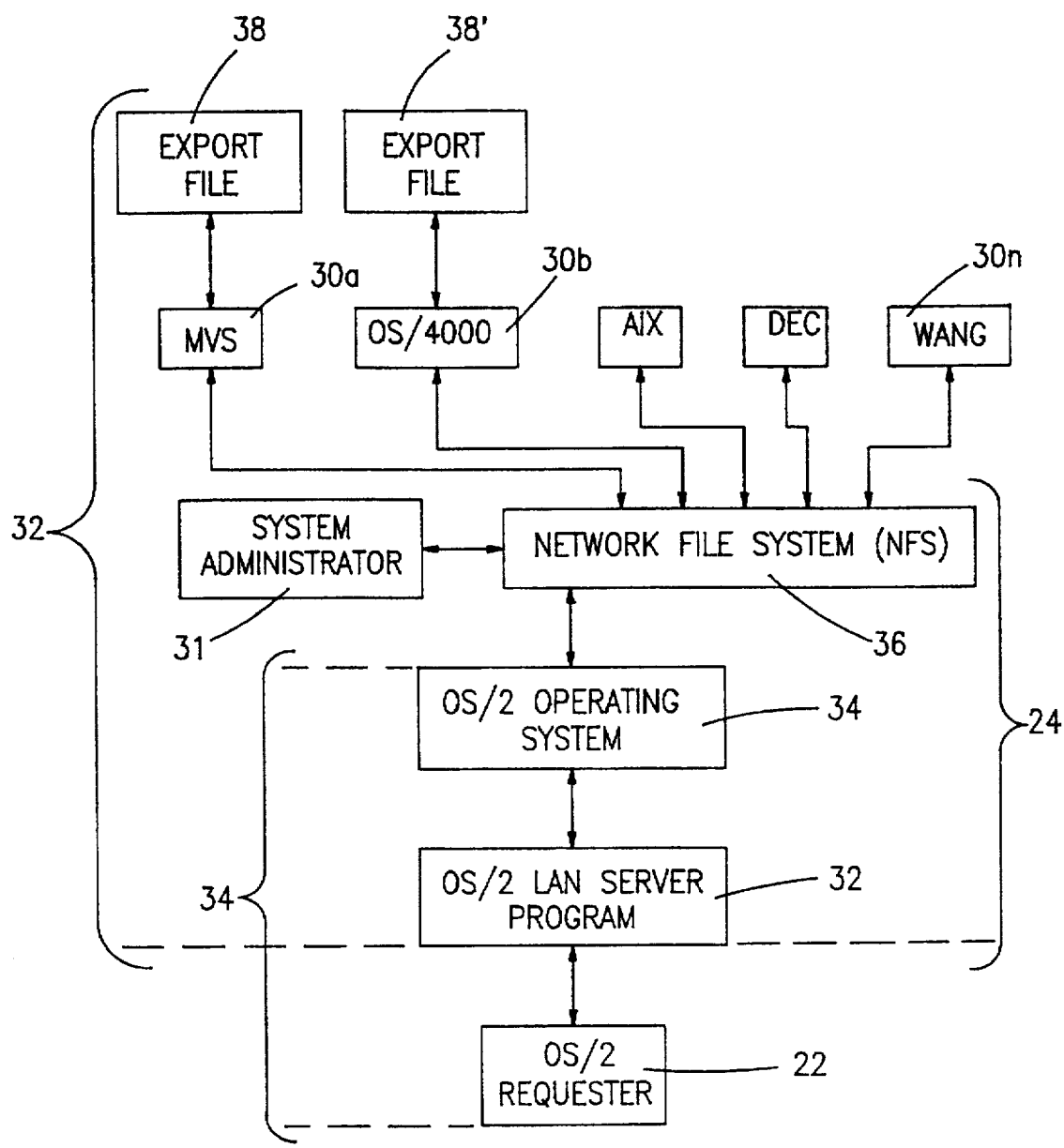
FIG. 3 is a more detailed schematic diagram of the system architecture shown in FIG. 2, and FIGS. 4, 5, 6 and 7 are a sequence of schematic diagrams showing the establishment of the architecture of the invention according to FIG. 2.

The redirection of the network according to the invention involves redirection at two levels, as will now be explained with reference to FIG. 3. Essentially, there are two client/server relationships established by the selective formation of network communication links: first, server A 24 is established as a client of servers B 26 and C 28 in FIG. 2 and second client 22 is established as a client of server A 24, as indicated by brackets 32 and 34 in FIG. 3, respectively. The overlap of these bracketed portions of the system corresponds roughly to operations carried out by server A 24 but server A also includes network file access system 36 as will now be explained.

The client or OS/2 requester issues a request by means of a LAN server program such as 32 which then uses the OS/2 operating system to access network file system 36. The network file system 36 then translates the request from the LAN server program 32 into a server identification and a file or directory identification in accordance with the contents of export file 38, established by the system administrator 31. Once this request has been translated to supply information in the export file to complete the specification of the NFS command, any host resource can be connected to the network such as MVS 30a, OS/4000 30b, Wang 30n, etc. by means of the network file access system in the usual manner.

It should be understood that the two level redirection allows network access to the distributed resource through whatever software supports the network communication between server A and other data processing means functioning as servers to server A. Therefore, there is no additional constraint upon the operating systems of other data processing means connected to the network. Accordingly, such other operating systems need not support the LAN server used for communication between any particular terminal and the server for that terminal.

In the general methodology of the present invention, the network is redirected at a first level by the translation of network file access commands at the network level in accordance with a file access list, if necessary. One level of redirection is available at any level of the network where an installable file system or its functional equivalent exists and a file access list may not always be necessary. If, for example, the invention were to be implemented with two LAN server programs establishing a hierarchical network, no file access list would be required to form network access commands. The network is redirected at a second level by the installable file system of the operating system of the client. The provision of two levels of redirection allows requested files, which effectively represent the entire contents of the shared resource to appear to exist on a single server and thus be available to a user through comparatively more user-friendly LAN server programs which are typically of limited accessing capability, as described above.

The preferred embodiment of the invention is specific to the TCP/IP-NFS™ product mentioned above; with regard to which a detailed description of the invention will now be provided. Because of the requirements of this product, network redirection by the LAN server (e.g. server A) requires an access list such as export file 38. In the preferred embodiment, an export file is created at each host, as generally indicated at 38'. This file is a list of accessible files according to each user-ID which is set up by the system administrator. The list contains the information necessary to develop system commands containing complete addresses of all files to which access has been granted to a particular user. This information is accessed by file identifications which are largely user-definable, as will be explained below, and accessible through LAN server program 32. While the development of the export file 38 may appear burdensome for the system administrator, entries in the export file need be made only once, when access is initially granted. The expenditure of this amount of time is effectively avoided each time the file is subsequently accessed by a user due to the convenience provided by the LAN server program 32 which is interfaced with the NFS system by virtue of the export file 38.

Figure 4:
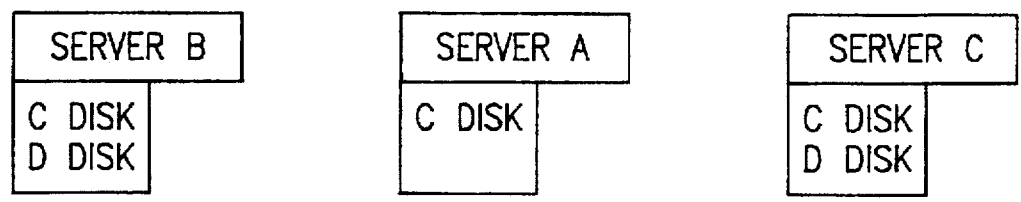
Figure 4:
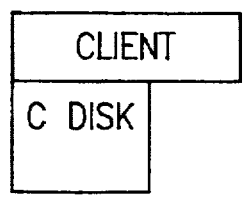

The procedure to establish the architecture of FIG. 2 by the system administrator will now be explained with reference to FIGS. 4–7. FIG. 4 illustrates initial conditions of the network including client 22 and servers 24, 26, 28. While it is to be understood that the hardware of the network connects these devices or machines, none are shown since, at this point the relationships between the portions of the network represented here as machines have not been defined. Also, for purposes of clarity, files or directories which can be shared and/or mounted will be simply referred to as disks. It should be noted, in this regard, that the partitioning of a shared resource into disks can also greatly simplify the formation of the export list by grouping of files to which access can commonly be granted to different users (e.g. sequestering limited access files to particular disks). It will be noted from FIG. 4 that each machine contains a C disk which contains the operating system and tools for each machine. Additionally, server B 26 and server C 28 are depicted as owning a D disk. Such a D disk or other disks could be owned by either of them or another node of the network altogether. Any of these machines could contain additional disks which can be thereafter shared in the same manner as will be discussed for the D disk.

Figure 5:
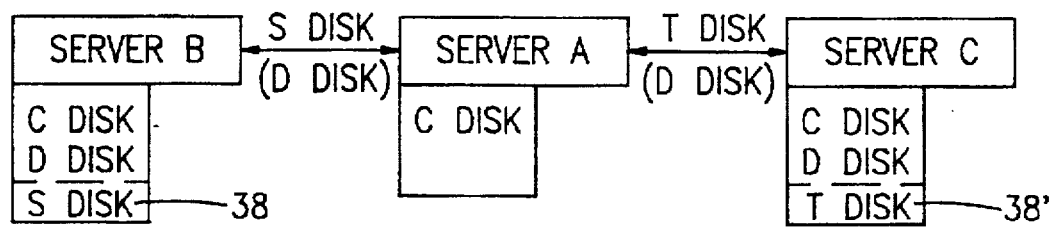
Figure 5:
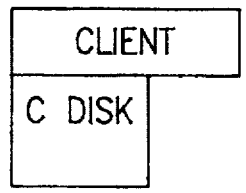

In FIG. 5, under control of a system administrator access, an export file 38, 38' is established to supply addresses for file access system (e.g. NFS) commands which will establish links over the network from server A to each of servers B and C, assuming the export list grants a user access to files on each of these servers. The system administrator can thus cause the exportation or use of resources from either of server B or C. However, since each of servers B and C contain a D disk, the system administrator must establish an alias for these separate files, here arbitrarily denominated as the S disk and the T disk. These aliases are stored in the respective export files 38 and 38', establishing the first level of network redirection, since, in the preferred embodiment of the invention, the data in the export files is used to establish communications links between server A and servers B and C.

Figure 6:
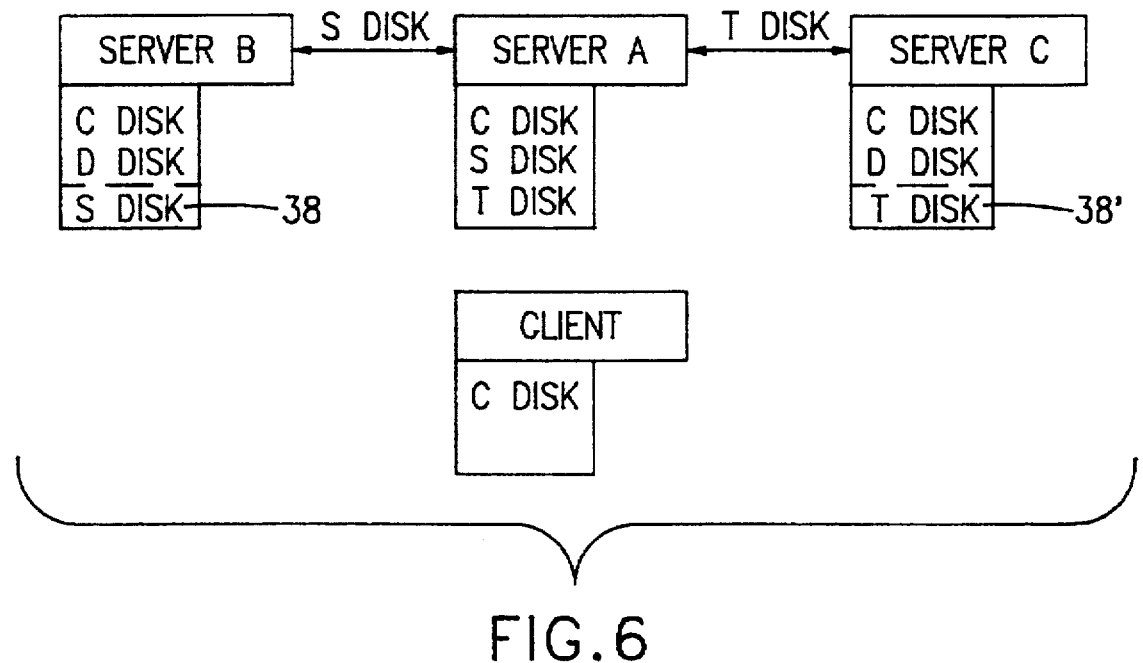

FIG. 6 shows the addition of the S and T disks to the contents of server A by installing (e.g. mounting) these disks in the file system of server A. These files may then physically reside at server A during the period of access. However, by virtue of some caching arrangement or the like, only small fractions of these disks need to exist or are likely to exist at server A at any point in time; the entirety of the disks only appearing to exist there because of the ability of server A to develop the illustrated bi-directional communication links with servers B and C through the export lists 38, 38'. Because of this function, which is transparent to the client terminal, the storage capacity of server A appears to be greatly multiplied. Accordingly, the S disk and the T disk are depicted in FIG. 6 as they functionally appear: as actual contents of server A. This feature of the invention also serves to virtually eliminate operational constraints on the system which would otherwise be engendered by limited hard drive capacity of the data processing means functioning as a server to the requesting terminal or, for that matter, the hard drive capacity of the terminal.

It should also be understood that one difference depicted between FIGS. 5 and 6 is that the bi-directional communications depicted in FIG. 5 with regard to the S and T disks is done directly by the system administrator (or by a user utilizing only the file access system). In FIG. 6 server A can accomplish these communication links itself through the file access system such as under control of a request developed through the LAN server program since, as illustrated, the S and T disks have been added to the contents of server A and can be accessed as needed due to the automatic development of network commands under control of export lists 38, 38'.

It should also be noted from FIGS. 4–6 that the C disks are not normally shared in the preferred embodiment of the invention. This is largely because each machine, by convention, will have a C disk so that at least an operating system can be stored locally for each machine. Also, some major difficulties can arise when different versions of the same operating system or plural operating systems are available simultaneously on the same machine. Providing for sharing of the C disk might also engender some ambiguity of addressing or require a larger address since each machine, by convention, includes a C disk whereas other disks would typically be owned by a single machine, although both servers B and C are shown as containing a D disk in FIGS. 4–7, for purposes of illustration. Therefore, because of redirection at the network level, the invention places no constraints upon the disk nomenclature at any point in the network. However, if desired, there is no theoretical reason why the C disk or portions thereof could not be shared in the same manner as the D disk. This might be advantageously be done for the purpose of reducing the amount of hardware provided at a given terminal or to allow the importation of an operating system with an application or particular data.

Figure 7:
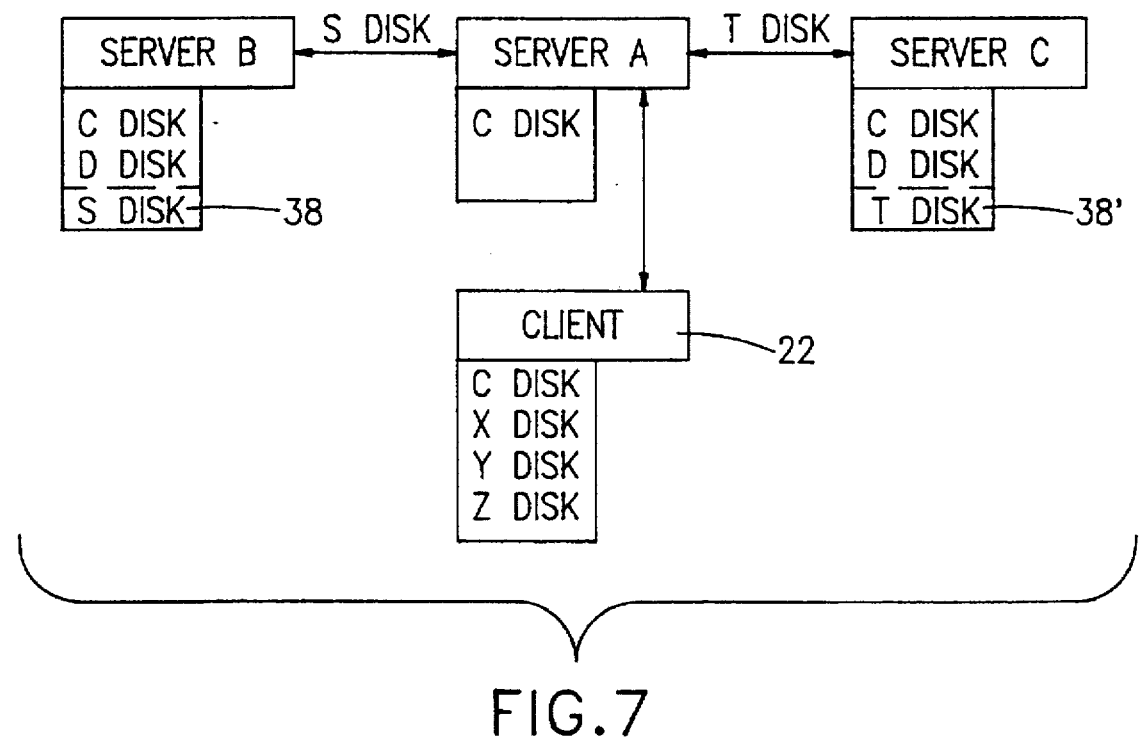

FIG. 7 shows the completion of the architecture according to the present invention as a bi-directional communication link is established between client 22 and server A by the provision of LAN server identifications of the files whose addresses are contained in the export file. For example, the file or directory identified by identifier "x" might be the S disk or a portion thereof, "y" the T disk or a portion thereof and "z" another portion of either of the S or T disk or some other disk available on the network. This redirection by the LAN server is the second level of redirection according to the invention. This feature also allows either the system administrator or the user, by redefinition, to specify the identifiers by which the user can call desired files. Thus, the client 22 will see only server A which, in turn, will appear to contain all of the D, S and T disks. The client will be able to access these files merely by calling the identifiers x, y and/or z, as if they were all resident on the client terminal. Accordingly, the entire network is effectively made transparent to the user and the entirety (e.g. storage capacity) of the shared resource appears to reside within the terminal, thus effectively multiplying the apparent capacity of the virtual machine. At the same time, the apparent capacity of each server also appears to be greatly multiplied since each server will now appear to contain the entire shared resource, as well.

By the use of the two levels of network redirection (e.g. using the LAN server to determine which machine owns a requested resource and developing a translation of a LAN command to a file access system command at the network level) the user sees none of the complexity of the network or the obtaining of access to a file. The user thus need know nothing of the network organization since the identification of the machine owning the desired resource and the identity of that resource on that machine are automatically provided in response to a user or system administrator defined identifier.

The preferred embodiment of the invention utilizes the IBM/Microsoft LAN server™ program and the NFS™ network file access system, as noted above. In this preferred embodiment of the invention, the process of developing the architecture of the preferred embodiment of FIG. 3, as illustrated in FIGS. 4–7 require a virtual machine running VM/TCP/IP (Virtual machine/transmission control protocol/internet protocol) and VM/NFS, an MVS machine running MVS/TCP/IP and MVS NFS, a machine running TCP/IP and ONC/NFS (Open Network Computing NFS) and an OS/2 machine such as a PS/2 running OS/2 version 1.3 Extended edition or greater, IBM/Microsoft LAN server 1.3 or greater and OS2/TCP/IP 1.1 or greater with the NFS client.

The specific steps used to accomplish the process illustrated in FIGS. 4–7 are:

1.) Be certain that suitable communication protocols are running on all hosts with 100% packets delivered (TCP/IP may be run with all operating systems and is preferred), 2.) Create an access list (e.g. export files) on all hosts that will be acting as servers (e.g. in AIX on the RS/6000, use the commands
   i.) vi/etc/exports
   ii.) Esc A
   iii.) /storage userhost
where "storage" is the exportable NFS drive with 6.0 GB DASD and "userhost" is the LAN server name running the NFS client, 3.) Make certain that NFS in some version is running on all serving hosts, 4.) On the OS/2 system, at the full screen OS/2 command prompt, type TCPSTART to initiate the TCP/IP processes (Comprehensive information on this is found in the installation guide for OS/2 TCP/IP., published by IBM Corporation and hereby incorporated by reference), 5.) At the OS/2 full screen command prompt, type "Mount x: carl/storage <enter>" where "carl" is the name of the AIX host, 6.) Repeat step 5 for each host (e.g. DEC, Wang, etc.) acting as a server, 7.) Verify that the OS/2 LAN server is operating correctly, and 8.) At the OS/2 full screen prompt, and for each NFS mounted drive, issue the command: net share blue=x (where "blue" is the alias created and "x" is the NFS mounted drive), net share green=y, etc.

In view of the above detailed description of the invention, it will be evident to those skilled in the art that the invention provides a system in which the entirety of a distributed resource can be made available to the user in a transparent manner such that the distributed resource appears to reside on each terminal and can be accessed by a user with a single logon operation and requires no technical knowledge of the network by the user. The system provided by the invention is fully compatible with other methods of network access including existing security arrangements for granting limited access to particular users.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A method of accessing portions of a distributed resource existing on one or more of a plurality of data processing means, said plurality of data processing means being linked by a network, comprising the steps of establishing existing user access authorizations at each of said data processing means containing a portion of said distributed resource, said existing access authorizations established at each said data processing means identifying authorized users of portions of the distributed resource owned by the data processing means at which the existing user access authorization is established, forming a first link of said network between a first data processing means of said plurality of data processing means in which a first portion of said distributed resource exists and a second data processing means of said plurality of data processing means in accordance with an existing access authorization for a predetermined user, exporting a second portion of said distributed resource, including all or part of said first portion of said distributed resource, from said first data processing means to said second data processing means in accordance with said existing access authorizations in response to forming said first link and storing said second portion of said distributed resource as a file at said second data processing means, and forming a second link of said network between a terminal associated with said predetermined user and said second data processing means of said plurality of data processing means whereby said distributed resource is accessible by said predetermined user.

2. A method as recited in claim 1, wherein said step of forming a first link of said network includes a step of installing said portion of said distributed resource existing at said first data processing means on a said second data processing means.

3. A method as recited in claim 2, wherein said portion of said distributed resource is a file and said step of installing a portion of said distributed resource includes mounting said file in a file structure of said second data processing means.

4. A method as recited in claim 3, wherein said step of forming a second link includes a step of installing a file which has been installed at said second data processing means on said terminal associated with said predetermined user.

5. A method as recited in claim 1, wherein said step of forming a second link includes a step of installing a file which has been installed at said second data processing means on said terminal associated with said predetermined user.

6. A network including a plurality of data processing means and a distributed resource, portions of said distributed resource existing at ones of said plurality of data processing means, said network including

- a first link between a terminal of said network and a predetermined one of said plurality of data processing means,
- a second link between said predetermined one of said plurality of data processing means and another data processing means of said plurality of data processing means, said second link being independent of said first link and said second link corresponding to an existing access authorization of a user to a first portion of said distributed resource which exists at said another data processing means of said plurality of data processing means, said another data processing means of said plurality of data processing means containing a first portion of said distributed resource accessible by a predetermined user associated with said terminal in accordance with said existing access authorization,
- each of said data processing means containing a portion of said distributed resource also including means for storing an export file comprising a list of existing user access authorizations,
- means responsive to said export file for exporting from said another data processing means a second portion of said distributed resource to said predetermined one of said plurality of data processing means, said second portion of said distributed resource including all or part of said first portion of said distributed resource corresponding to said access authorization at said predetermined one of said plurality of data processing means, and
- means for storing said second portion of said distributed resource at said predetermined on of said plurality of data processing means for access by said terminal of said network over said first link.

7. A network as recited in claim 6, wherein each of said plurality of data processing means includes a file structure and further including means for installing at least one file from the file structure of said another data processing means on the file structure of said predetermined one of said data processing means.

8. A network as recited in claim 7, wherein each of said plurality of data processing means includes a file structure and further including means for installing at least one file from the file structure of said predetermined one of said data processing means on said terminal.

9. A network as recited in claim 6, further including means for installing at least one file from the file structure of said predetermined one of said data processing means on said terminal.

* * * * *